(12) United States Patent
Pinkerton

(10) Patent No.: US 10,555,058 B2
(45) Date of Patent: Feb. 4, 2020

(54) WIRELESS CONDITION MONITORING SENSOR WITH NEAR FIELD COMMUNICATION COMMISSIONING HARDWARE

(71) Applicant: Aktiebolaget SKF, Gothenburg (SE)

(72) Inventor: Alexander Pinkerton, Aberdeen (GB)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/019,635

(22) Filed: Jun. 27, 2018

(65) Prior Publication Data

US 2020/0007961 A1    Jan. 2, 2020

(51) Int. Cl.
| | | |
|---|---|---|
| *H02K 35/02* | (2006.01) | |
| *H04Q 9/00* | (2006.01) | |
| *H04B 5/00* | (2006.01) | |

(52) U.S. Cl.
CPC ............ *H04Q 9/00* (2013.01); *H04B 5/0043* (2013.01); *H04Q 2209/40* (2013.01)

(58) Field of Classification Search
CPC ..... H04Q 9/00; H04Q 2209/40; H04B 5/0043
See application file for complete search history.

(56) References Cited

U.S. PATENT DOCUMENTS

| | | | |
|---|---|---|---|
| 7,364,144 B2 | 4/2008 | Nordmeyer | |
| 7,412,898 B1* | 8/2008 | Smith | G01L 5/24 |
| | | | 73/761 |
| 7,636,031 B2 | 12/2009 | Mirmobin et al. | |
| 2006/0042734 A1* | 3/2006 | Turner | B60C 11/24 |
| | | | 152/154.2 |
| 2006/0164214 A1* | 7/2006 | Bajahr | B60C 23/0413 |
| | | | 340/10.41 |
| 2006/0167659 A1 | 7/2006 | Miyasaka et al. | |
| 2007/0205880 A1* | 9/2007 | Hattori | B60C 23/0413 |
| | | | 340/442 |
| 2010/0308969 A1* | 12/2010 | Okada | G01D 5/48 |
| | | | 340/10.1 |
| 2015/0172790 A1 | 6/2015 | Restituto et al. | |
| 2016/0195453 A1* | 7/2016 | Erskine | G01M 13/04 |
| | | | 73/865.8 |
| 2016/0305814 A1* | 10/2016 | Pita-Gil | G01G 19/02 |
| 2017/0029001 A1* | 2/2017 | Berggren | B61L 23/042 |
| 2017/0199101 A1* | 7/2017 | Franchitti | B61K 9/00 |
| 2018/0166962 A1* | 6/2018 | Kim, II | B61C 17/06 |

* cited by examiner

*Primary Examiner* — Munear T Akki
(74) *Attorney, Agent, or Firm* — Garcia-Zamor Intellectual Property Law, LLC; Ruy Garcia-Zamor; Bryan Peckjian

(57) ABSTRACT

A condition monitoring sensor including an attachment component and a housing is provided. The housing includes a contact surface, at least one sensor, a data collector, and data transmission electronics. The contact surface includes an outward facing portion of the housing that receives a commissioning device. The data collector includes a processor and a memory. The data transmission electronics include a near field communication transponder.

16 Claims, 4 Drawing Sheets

WIRELESS CONDITION MONITORING SENSOR WITH NEAR FIELD COMMUNICATION COMMISSIONING HARDWARE

BACKGROUND

Rail maintenance crews inspect locomotives, including rail bogie wheels, axle-boxes, etc. Presently, rail maintenance crews visually check a geometry of the axle-boxes and components associated therewith, such as a sensor. To assist with their inspecting, optical sensors/identifiers (e.g., a bar code) can be attached to the axle-boxes to identify each axle-box. In turn, rail maintenance crews utilize the optical sensors/identifiers to complete documentation memorializing the inspection. Despite the use of optical sensors/identifiers, manual inspections are time consuming and require a particular expertise that few individuals within the rail maintenance crews possess.

SUMMARY

According to one or more embodiments, a condition monitoring sensor including an attachment component and a housing is provided. The housing includes a contact surface, at least one sensor, a data collector, and data transmission electronics. The contact surface includes an outward facing portion of the housing that receives a commissioning device. The data collector includes a processor and a memory. The data transmission electronics include a near field communication transponder.

According to one or more embodiments, the condition monitoring sensor can also be implemented in a system or as a computer program product and/or method.

According to one or more embodiments, a method for executing a commissioning operation of a condition monitoring sensor is provided. The condition monitoring sensor includes a near field communication transponder and a memory. The method is executable by a commissioning device including a second near field communication transponder and an inclinometer. The method includes detecting, by the second near field communication transponder, a near field communication transponder of the condition monitoring sensor. The method includes procuring, by the commissioning device, a unique sensor identifier stored in the memory or the near field communication transponder of the condition monitoring sensor. The method includes executing, by the inclinometer, a read of internal X, Y, and Z angles to secure an orientation of the condition monitoring sensor relative to a vibration source of a mechanical system.

According to one or more embodiments, the method can also be implemented in a system or as a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

In view of the above, embodiments disclosed herein may include a system, method, and/or computer program product (herein a system) that enable rail maintenance crews to use a commissioning device (e.g., a mobile computing device, such as smart a phone or a tablet) to quickly commission wireless condition monitoring sensors. Each commissioning includes an automatic registration of a unique sensor identifier corresponding to a wireless condition monitoring sensor and a location angle of that commission wireless sensor.

The technical effects and benefits of the system include eliminating problems associated with optical sensors/identifiers, as well as the time consuming nature and expertise requirements of manually/visually determining the geometry of sensors. In accordance with one or more embodiments, the technical effects and benefits of embodiments herein ensure that an angle or center axis of a condition monitoring sensor matches a radial line extending from a center of a vibration source to a center of a securing bolt to which the condition monitoring sensor is affixed. In accordance with one or more embodiments, the technical effects and benefits of embodiments herein ensure that an angle or center axis of a condition monitoring sensor is perpendicular to the ground (e.g., a vertical orientation). Thus, embodiments described herein are necessarily rooted in the processors and memories of the system to perform proactive operations to overcome problems specifically arising in the realm of commissioning wireless condition monitoring sensors.

Figure 1:
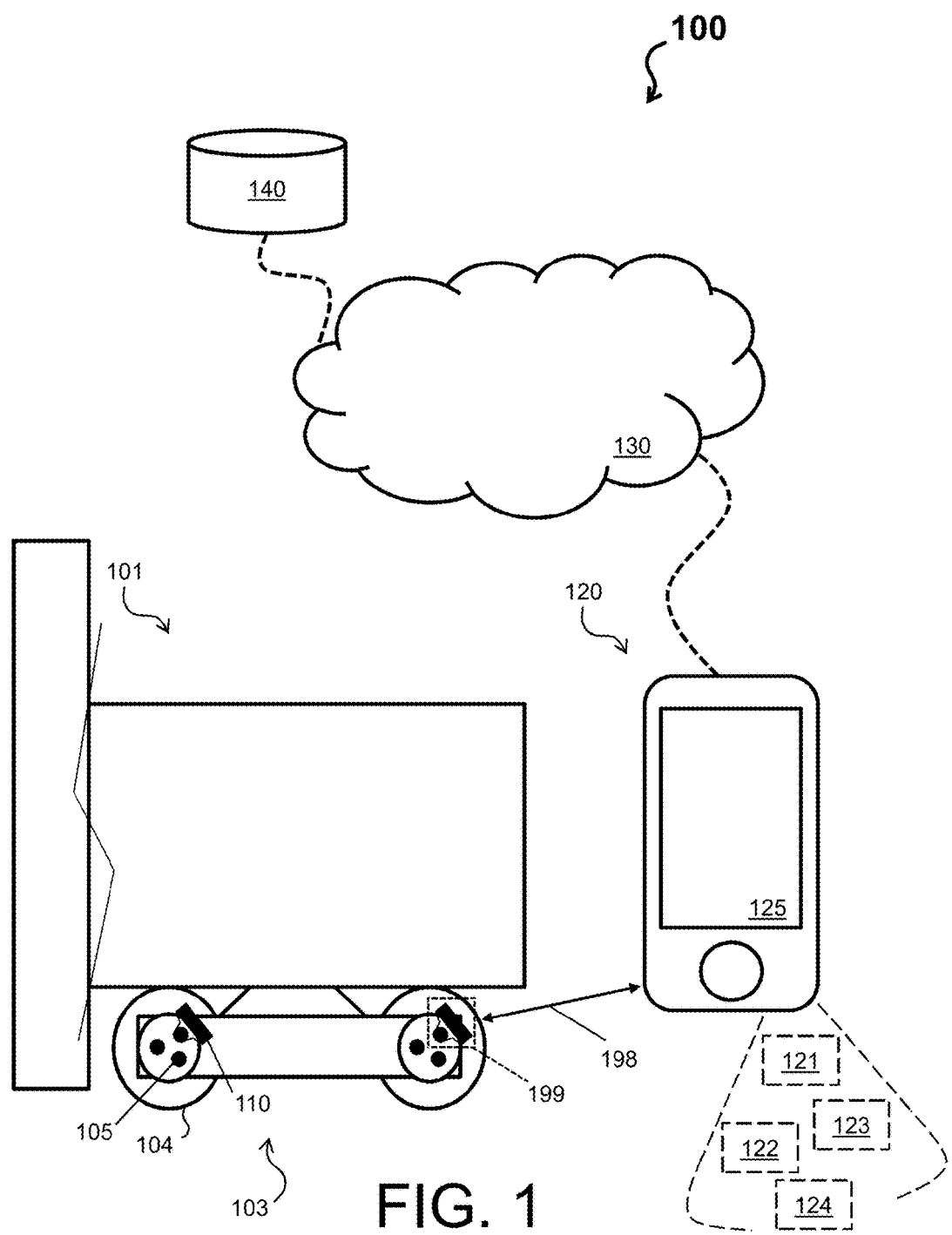
FIG. 1 depicts a system in accordance with one or more embodiments.

Turning now to FIG. 1, for example, an environment includes a railcar 101 including at least one axle-box 103. The axle-box 103 includes one or more wheels 104 attached thereto by fastening elements 105. Note that, while only a single axle-box is show, most railcars have four axle-boxes with eight wheels attached thereto (by a rail bogie wheel axle-box bearing for example). In general, a bearing housing of the axle-box 103 includes a rail bogie wheel axle-box bearing that supports a corresponding wheel 104 and a bolt configuration that attached the bearing housing to the axle-box 103.

Further, a system 100 is generally shown in accordance with one or more embodiments. The system 100 can be an electronic, computer framework comprising and/or employing any number and combination of computing device and networks utilizing various communication technologies, as described herein. The system 100 can be easily scalable, extensible, and modular, with the ability to change to different services or reconfigure some features independently of others.

The system 100 includes at least one of a plurality of condition monitoring sensors 110. Each condition monitoring sensor 110 includes at least one sensor (e.g., sensors for vibration, temperature, etc.), a data collector (e.g., a processor and a memory as described herein), and data transmission electronics (e.g., a wireless modem and/or a near field communication (NFC) transponder). For example, each condition monitoring sensor 110 can be a compact, battery-operated device that measures vibration and temperature of the wheel 104 to which it is attached (e.g., specifically, being attached to least one of the fastening elements 105 of that wheel 104, which can be a rail bogie wheel). Note that operations of the condition monitoring sensors 110 rely on their orientation relative to a center of the vibration source (e.g., a rail bogie wheel axle-box bearing). Via the data transmission electronics, each condition monitoring sensor 110 can wirelessly transmit static and dynamic data to external devices, servers, and systems. In accordance with one or more embodiments, the memory and/or the NFC transponder of each condition monitoring sensor 110 can store or be associated with a unique sensor identifier. For instance, an NFC transponder can be pre-programmed with a unique identifier associated with a wireless modem internal to a condition monitoring sensor 110.

The system 100 includes a commissioning device 120 including one or more central processing units (CPU(s)) (collectively or generically referred to as a processor 121). The processor 121 is coupled via a system bus to a system memory 122 and various other components. The system memory 122 can include a read only memory (ROM) and a random access memory (RAM). The ROM is coupled to the system bus and may include a basic input/output system (BIOS), which controls certain basic functions of the system 100. The RAM is read-write memory coupled to the system bus for use by the processor 121. Software for execution on the system 100, such as the commissioning operation described herein, may be stored in the system memory 122.

Figure 2:
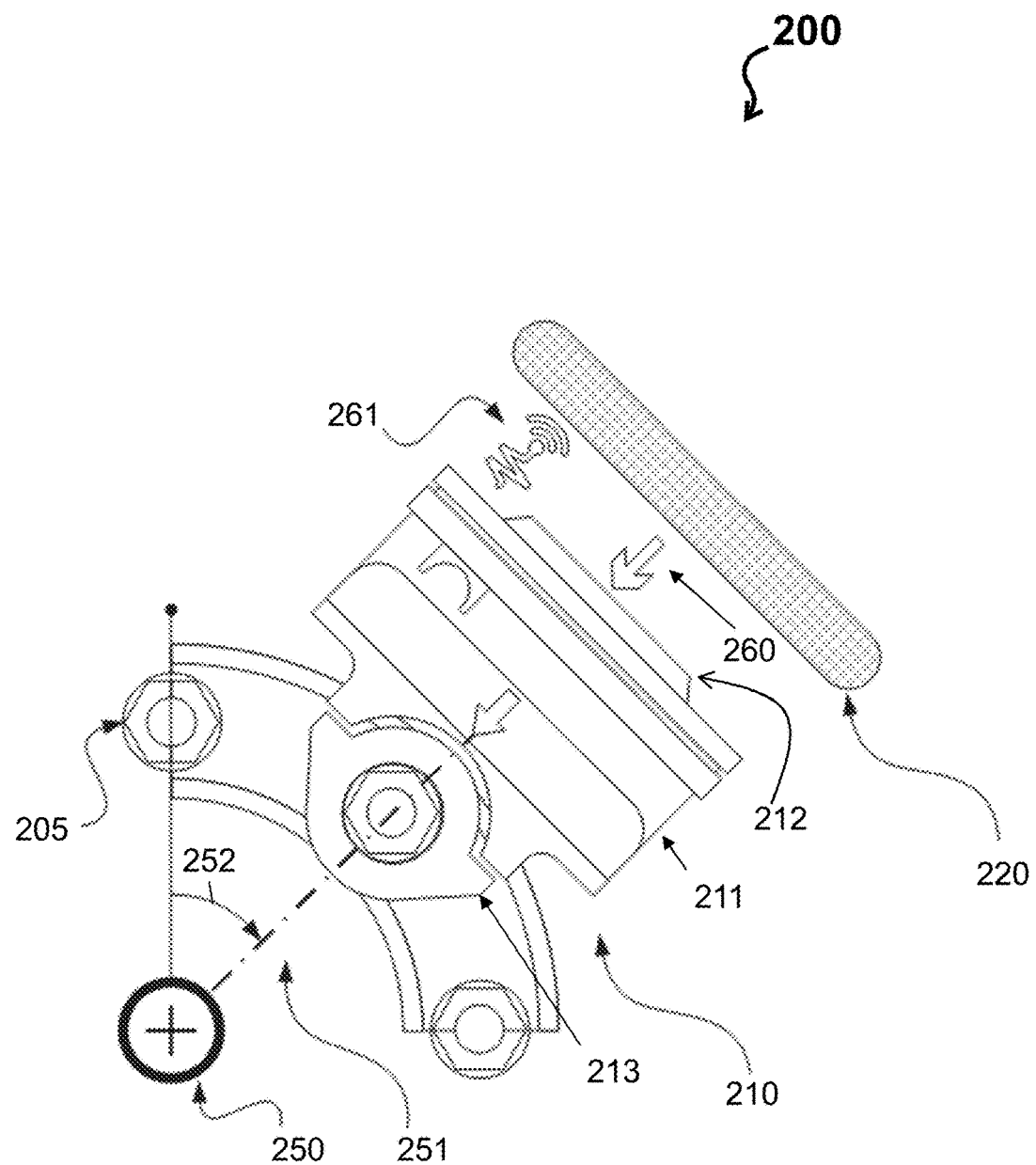
FIG. 2 depicts a schematic of an interaction between a condition monitoring sensor and a mobile device in accordance with one or more embodiments.
Figure 3:
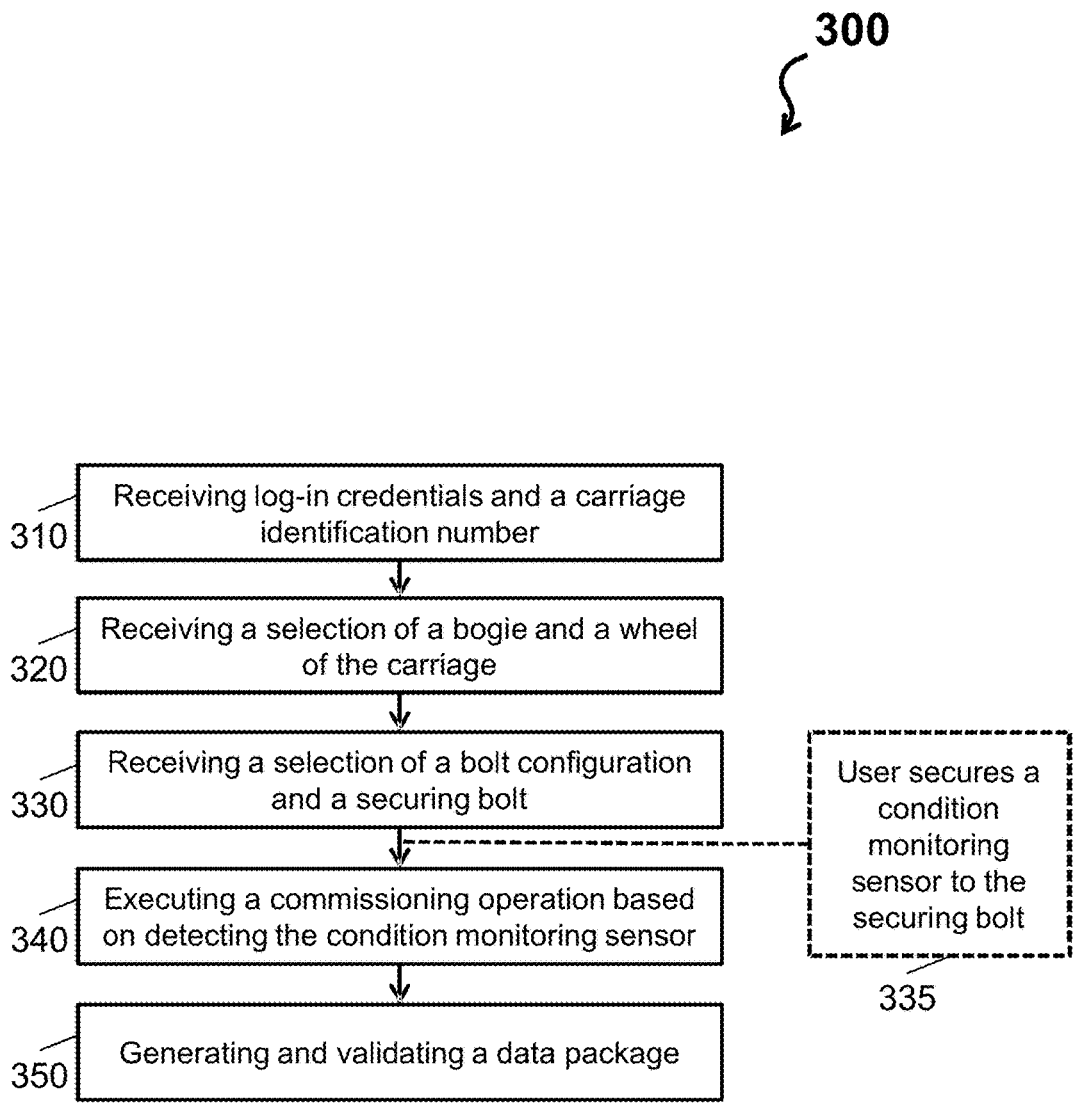
FIG. 3 depicts a process flow of a system in accordance with one or more embodiments.

The system memory 122 is an example of a tangible storage medium readable by the processor 121, where the software is stored as instructions for execution by the processor 121 to cause the system 100 to operate, such as is described herein with reference to FIGS. 2-3. Examples of computer program product and the execution of such instruction are discussed herein in more detail.

The commissioning device 120 includes one or more input/output (I/O) adapters 123 coupled to the system bus. The one or more input/output adapters 123 may include a small computer system interface (SCSI) adapter that communicates with the system memory 122 and/or any other similar component. The one or more input/output adapters 123 may include an NFC transponder that communicates with the NFC transponders of the condition monitoring sensors 110. For example, the one or more input/output adapters 123 can interconnect the system bus with a network 130, which may be an outside network, enabling the system 100 to communicate with other such systems (i.e., the server 140).

The commissioning device 120 includes a micro-electromechanical system (MEMS) sensor 124, which is a miniaturized mechanical and electro-mechanical element (i.e., electronic device and structure, circuitry thereof) that converts a measured mechanical signal into an electrical signal. The MEMS sensor 124 can include analog and/or digital inclinometers (tilt sensors) capable of measuring positive and negative inclinations (angle), for example, along a range from +/−1° to +/−90°, in one, two, and three axis configurations. The MEMS sensor 124 can include analog and digital accelerometers capable of measuring positive and negative accelerations, for example, along a range from +/−0.5 g to +/−40 g. Note that the processor 121, the system memory 122, the one or more input/output adapters 123, and the MEMS sensor 124, while shown as dashed boxes external to the commissioning device 120 for ease of clarity in depicting the system 100, are clearly internal components of the commissioning device 120. The commissioning device 120 can also include a display 125 (e.g., touch display) for a user interface, interface buttons, a global positioning system, audio/video components, etc.

The system 100 also includes the network 130 and the server 140. The network 130 includes a set of computers connected together, sharing resources. The network 1230 can be any type of network, including a local area network (LAN), a wide area network (WAN), or the Internet, as described herein. The server 140 comprises a processor and a memory (as described herein) and provides various functionalities to the commissioning device 120, such as sharing and storing data, providing resources, or performing computations.

In operation, the commissioning device 120 performs a commission operation for each of the condition monitoring sensors 110. The commission operation initiates based on the commissioning device 120 coming into contact (as represented by double arrow 198) with each condition monitoring sensors 110. For ease of explanation, a dotted box 199 itemizing a portion of the system 100 is further described with respect to FIG. 2.

FIG. 2 depicts a schematic 200 including a plurality of securing bolts 205 (e.g., the fastening elements 105 of FIG. 1) and a condition monitoring sensor 210 (e.g., one of the condition monitoring sensors 110 of FIG. 1) affixed to one of the plurality of securing bolts 205. The condition monitoring sensor 210 includes at least a housing 211, a contact surface 212, and an attachment component 213. The housing 211 contains at least one sensor, a data collector, and data transmission electronics. The contact surface 212 is an outward facing portion of the housing 211 that receives a commissioning device 220 (e.g., the commissioning device 120 of FIG. 1). The attachment component 213 can be any bracket, flange, or the like that attaches the condition monitoring sensor 210 to a mechanical system to be monitored.

The condition monitoring sensor 210 is affixed/secured to one of the plurality of securing bolts 205. As the operation of the condition monitoring sensor 210 is reliant on an orientation relative to a center 250 of a vibration source (e.g., a rail bogie wheel axle-box bearing), it is critical to ensure that an angle or center axis 251 of the condition monitoring sensor 210 matches (e.g., as closely as possible) a radial line extending from the center 250 of the vibration source to a center of the securing bolt to which the condition monitoring sensor 210 is affixed.

The angle or center axis 251 can be measure with respect to an angle or center axis 252 of another securing bolt, respect to a vertical orientation, or center axis 252 of another securing bolt be pre-determined based on which securing bolt the condition monitoring sensor 210 is affixed/secured to (e.g., each of the securing bolts can correspond to an predetermined angle for placement and orientation of the condition monitoring sensor 210).

The schematic 200 of FIG. 2 also depicts an interaction (e.g., a commissioning operation) between the condition monitoring sensor 210 and the commissioning device 220 in accordance with one or more embodiments. The commissioning device 220 is placed 260 on the contact surface 212 to read the unique sensor identifier of the condition monitoring sensor 210 via an NFC transaction (between the respective NFC transponders). Note that the commissioning device 220 is placed "flat" and/or in direct contact with contact surface 212 of the condition monitoring sensor 210.

In response to reading/receiving the unique sensor identifier from the condition monitoring sensor 210, the commissioning device 220 executes a read of X, Y, and Z angles using the built-in Micro-electro-mechanical system (MEMS) sensor inclination measurement by an inclinometer to secure the X, Y, and Z angles of the condition monitoring sensor 210. The read of the X, Y, and Z angles renders an orientation of center axis 251 of the condition monitoring sensor 210.

After the interaction between the condition monitoring sensor 210 and the commissioning device 220, the commissioning device 220 can local store and/or externally provide the unique sensor identifier and the orientation of center axis 251 of the condition monitoring sensor 210. In accordance with one or more embodiments, The commissioning device 220 can associate the unique sensor identifier and the orientation of center axis 251 with other data, such as a physical location at the time of measurement (using a global position system) and a physical location that the condition monitoring sensor 210 is secured to (e.g., one what piece of equipment it has been secured and where, such as which securing bolt on the axle-box), to generate a data package for the condition monitoring sensor 210.

The commissioning device 220 can communicate this data package to a remote server (e.g., a cloud hosted server, such as the server 140 of FIG. 1), thereby enabling the identity, the geometry, and the locations of the condition monitoring sensor 210 to be associated with any and all measurement data (e.g., vibration and temperature of the wheel 104) procured and communicated by the condition monitoring sensor 210.

Turning now to FIG. 3, a process flow 300 of the system 100 is depicted according to one or more embodiments. The process flow 300 is an example of commissioning operation and is described with respect to a locomotive example as shown by the railcar 101 of FIG. 1 and the schematic 200 of FIG. 2. The process flow 300 begins at block 301, where the commissioning device 220 at block 310 receives log-in credentials and a carriage identification number (as user inputs by a user, such as an individual with a rail maintenance crew). The log-in credentials can include a user name and password or the like. The carriage identification number can be a designation of the railcar 101. The log-in credentials and the carriage identification number can be entered via a user interface of the commissioning device 220, such as through the display 125, through audio commands received by audio devices of the commissioning device 220, through video operations (detecting a quick response code) by video devices of the commissioning device 220, etc.

Further, through subsequent prompts on the user interface, the user may validate the log-in credentials and the carriage identification number, indicate that the user desires to commission a new condition monitoring sensor 210, and/or indicate that the user desires to review existing condition monitoring sensor 210. In the case of commissioning or reviewing, the process flow proceeds to blocks 320 and 330.

At block 320, the commissioning device 220 receives a selection of a bogie and a wheel of the carriage. As noted herein, most railcars have four axle-boxes with eight wheels attached thereto (by a rail bogie wheel axle-box bearing for example). At block 330, the commissioning device 220 receives a selection of a bolt configuration and a securing bolt. In accordance with one or more embodiments, the user interface of the commissioning device 220 can provide visual prompts to receive touch screen user inputs identifying the bogie and the wheel, and further the bolt configuration and the securing bolt. Note that the bolt configuration includes a number of bolts and a bolt orientation.

For instance, a three bolt configuration can be arranged in a triangle orientation, a four bolt configuration can be arranged in a square orientation, a five bolt configuration can be arranged in a pentagram orientation, etc. The condition monitoring sensor 210 is affixed to one of the bolts in the bolt configuration.

As shown at dash-block 335, a user can secure a condition monitoring sensor 210 to the securing bolt (if one is not secured already). Note that operations of the condition monitoring sensors 310 rely on their orientation relative to a center of the vibration source (e.g., a rail bogie wheel axle-box bearing). Thus, it is critical to ensure that an angle or center axis 251 of the condition monitoring sensor 210 matches (e.g., as closely as possible) a radial line extending from the center 250 of the vibration source to a center of the securing bolt to which the condition monitoring sensor 210 is affixed.

At block 340, the commissioning device 220 executes a commissioning operation based on detecting the condition monitoring sensor 210. In accordance with one or more embodiments, the user interface of the commissioning device 220 can provide visual prompts to receive touch screen user inputs when executing the commissioning operation.

The commissioning operation (e.g., the commission operation described with respect to FIG. 2) can include procuring the unique sensor identifier, the orientation of center axis 251, and other data. The commissioning operation can include associating the data package with measurement data procured and communicated by the condition monitoring sensor 210. In accordance with one or more embodiments, the user ensures that the condition monitoring sensor 210 points to a bearing center by memorializing the orientation in a photo. The user can also trigger a sensor reading using a magnet.

At block 350, the commissioning device 220 generates and validates a data package. For example, the user interface of the commissioning device 220 can prompts to receive touch screen user inputs when generating a data package for the condition monitoring sensor 210, communicating this data package to the server 140, etc.

Figure 4:
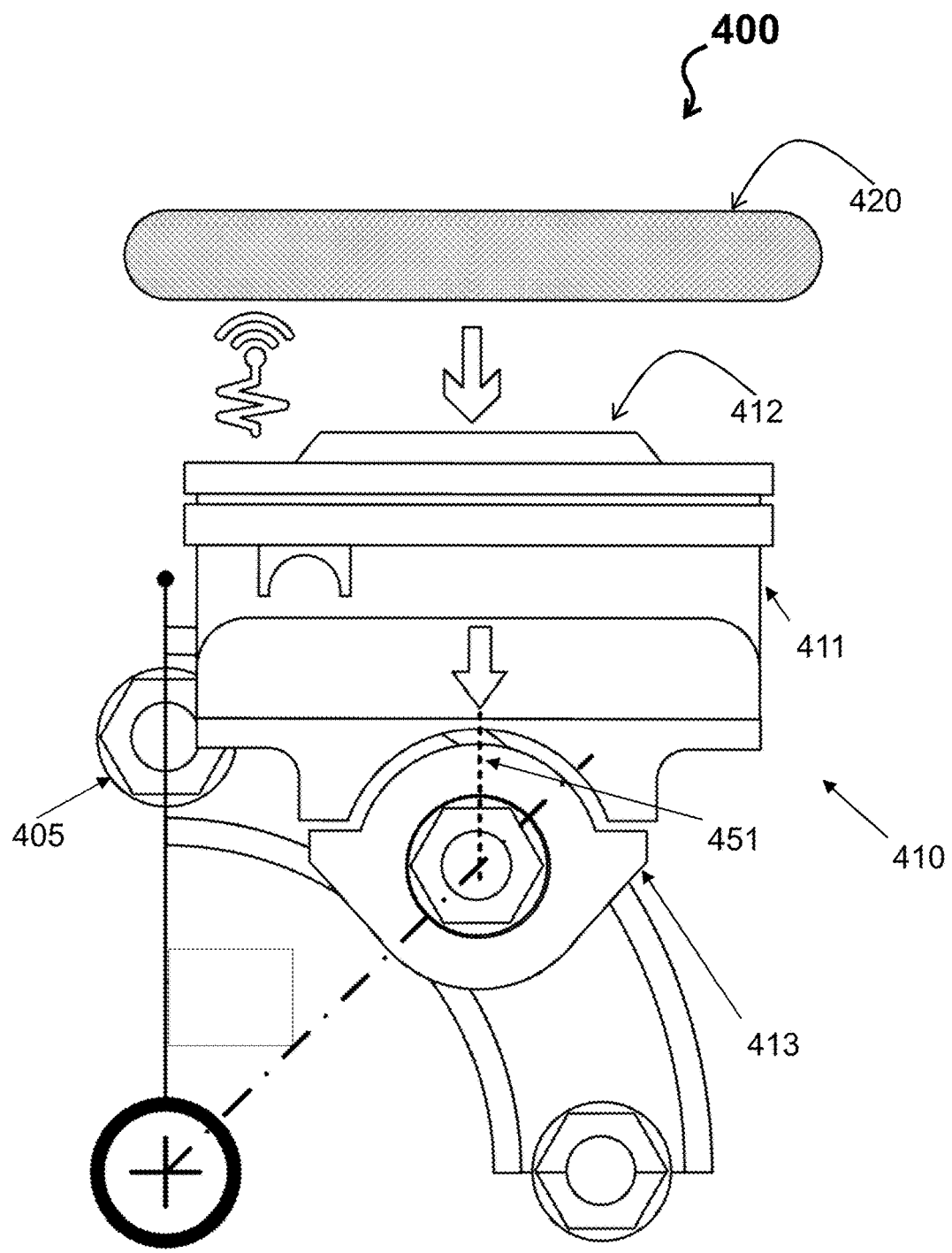
FIG. 4 depicts a schematic of an interaction between a condition monitoring sensor and a mobile device in accordance with one or more embodiments.

Turning now to FIG. 4, a schematic 400 depicting a vertical alignment is shown in accordance with one of more embodiments. The schematic 400 includes a plurality of securing bolts 405 (e.g., the fastening elements 105 of FIG. 1) and a condition monitoring sensor 410 (e.g., one of the condition monitoring sensors 110 of FIG. 1) affixed to one of the plurality of securing bolts 405. The condition monitoring sensor 410 includes at least a housing 411, a contact surface 412, and an attachment component 413. The housing 411 contains at least one sensor, a data collector, and data transmission electronics. The contact surface 412 is an outward facing portion of the housing 411 that receives a commissioning device 420 (e.g., the commissioning device 120 of FIG. 1). The attachment component 413 can be any bracket, flange, or the like that attaches the condition monitoring sensor 210 to a mechanical system to be monitored.

The condition monitoring sensor 410 is affixed/secured to one of the plurality of securing bolts 405. As the operation of the condition monitoring sensor 410 is reliant on an orientation relative to a center 450 of a vibration source (e.g., a rail bogie wheel axle-box bearing), it is critical to ensure that an angle or center axis 451 of the condition monitoring sensor 410 matches (e.g., as closely as possible) a vertical orientation with respect to the ground.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A condition monitoring sensor comprising:
   an attachment component attached to a housing and affixed to an axel box;
   a center axis providing an orientation relative to a center of a vibration source of the axel box; and
   the housing comprising:
   a contact surface comprising an outward facing portion of the housing that is contacted by a commissioning device,
   at least one sensor for measuring conditions of the axel box,
   a data collector comprising a processor and a memory for storing the measured conditions and data, and
   data transmission electronics comprising a first near field communication transponder for transmitting the data.

2. The condition monitoring sensor of claim 1, wherein operations of the condition monitoring sensor rely on an orientation of the condition monitoring sensor.

3. The condition monitoring sensor of claim 2, wherein the orientation is a vertical orientation with respect to a ground.

4. The condition monitoring sensor of claim 1, wherein the attachment component comprises bracket or flange that attaches the condition monitoring sensor to the axel box.

5. The condition monitoring sensor of claim 1, wherein the at least one sensor measures vibrations or temperatures of the axel box.

6. The condition monitoring sensor of claim 1, wherein the data transmission electronics wirelessly transmit static or dynamic data to devices, servers, or systems external to the condition monitoring sensor.

7. The condition monitoring sensor of claim 1, wherein the memory or the near field communication transponder stores a unique sensor identifier.

8. A system comprising: the condition monitoring sensor of claim 1; and the commissioning device comprising a second near field communication transponder and an inclinometer.

9. The system of claim 8, wherein the commissioning device procures a unique sensor identifier of the condition monitoring sensor via a near field communication transaction when placed on the contact surface of the housing.

10. The system of claim 8, wherein the commissioning device executes a read of internal X, Y, and Z angles using the inclinometer to secure an orientation of the condition monitoring sensor relative to a vibration source of the axel box.

11. A method for executing a commissioning operation of a condition monitoring sensor comprising a first near field communication transponder and a memory, a method executable by a commissioning device comprising a second near field communication transponder and an inclinometer comprising:
   detecting, by the second near field communication transponder, a near field communication transponder of the condition monitoring sensor affixed to an axel box;
   procuring, by the commissioning device, a unique sensor identifier stored in the memory or the near field communication transponder of the condition monitoring sensor; and
   executing, by the inclinometer, a read of internal X, Y, and Z angles to secure an orientation of the condition monitoring sensor relative to a vibration source of the axel box, a center axis of the condition monitoring sensor providing the orientation relative to a center of the vibration source of the axel box.

12. The method of claim 11, wherein the commissioning device generates a data package comprising the unique sensor identifier and the orientation of the condition monitoring sensor.

13. The method of claim 11, wherein operations of the condition monitoring sensor rely on an orientation of the condition monitoring sensor.

14. The method of claim 13, wherein the orientation is a vertical orientation with respect to a ground.

15. The method of claim 11, wherein the commissioning operation associates a data package with measurement data procured and communicated by the condition monitoring sensor to the commissioning device.

16. The method of claim 11, wherein the commissioning device receives a selection of a selection of a bolt configuration and a securing bolt of the mechanical system via a user interface provided by a display of the commissioning device.

* * * * *